Jan. 11, 1966 W. B. GROSS 3,229,077
FLUID BLENDING APPARATUS USING DIGITAL COMPUTING MEANS
Filed Jan. 22, 1962
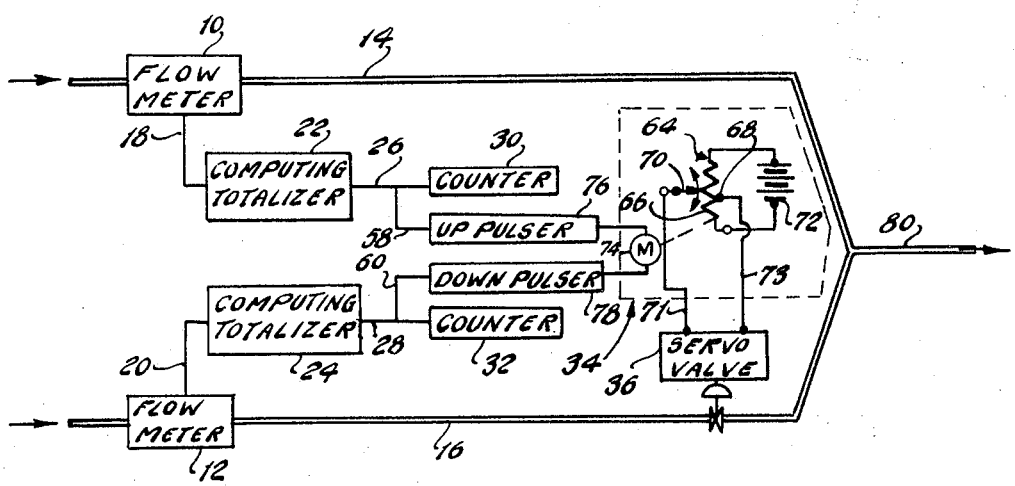
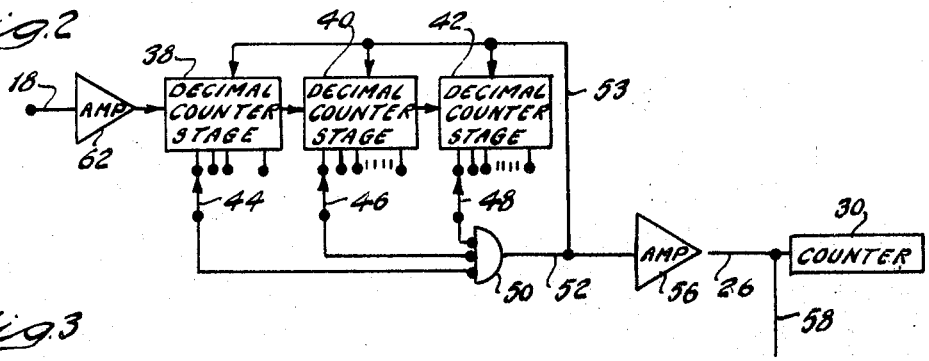
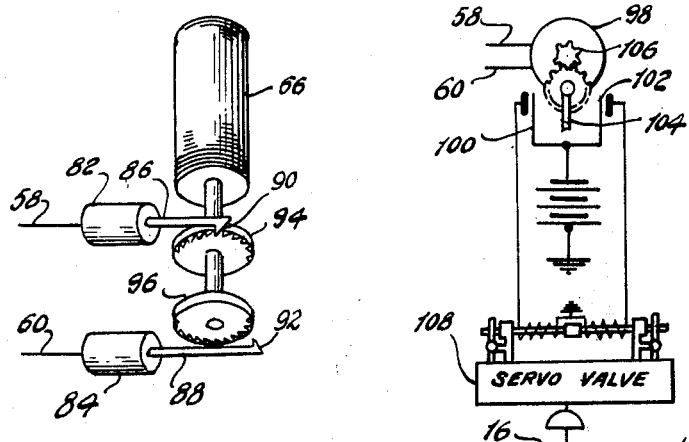
INVENTOR.
WILLIAM B. GROSS
BY Whittemore
Hulbert & Belknap
ATTORNEYS.

United States Patent Office 3,229,077
Patented Jan. 11, 1966

3,229,077
FLUID BLENDING APPARATUS USING DIGITAL
COMPUTING MEANS
William B. Gross, Oak Park, Mich., assignor to Performance Measurement Company, Detroit, Mich., a corporation of Michigan
Filed Jan. 22, 1962, Ser. No. 167,564
3 Claims. (Cl. 235—151.34)

The invention relates to material blending and refers more specifically to apparatus for blending a plurality of flowable materials in selected predetermined ratios including a separate computing totalizer for each separate material and improved electro-mechanical blend control and memory means.

In the past apparatus for blending a plurailty of flowable materials such as gasolines of different octanes in selected predetermined ratios has been relatively complicated and therefore expensive and somewhat unreliable. Consequently blending apparatus has not in the past been used as extensively as it would be if it were more economical and reliable.

In prior blending apparatus electronic memory means for providing a memory of the quantity of each fuel blended or the difference between the quantities of fuel blended in one or both directions from a predetermined blending ratio have been provided. Such electronic memory devices are a large part of the expense of the blending systems and add greatly to the complicated nature thereof.

It is therefore an object of the present invention to provide improved blending apparatus for flowable material.

Another object is to provide blending apparatus for a plurality of flowable materials including a separate digital computing totalizer for each material and electro-mechanical blend control and memory means.

Another object is to provide apparatus for blending a plurality of flowable materials in selected predetermined proportions comprising sepaarte means responsive to the flow of each material for developing a separate pulsed signal the number of pulses of which is proportional to the volume of flow of the material producing the separate signal, computing totalizers for receiving the pulsed signals, dividing the signals by predetermined factors to produce the same number of output pulses from each separate pulsed signal when the flow of each separate material is such as to produce the predetermined proportions and to produce a different number of ouput pulses from the separate pulsed signals on deviation of the proportions of the materials blended from the predetermined proportions thereof, an electro-mechanical blend control and memory means responsive to the pulses of each computing totalizer for providing an electrical signal of magnitude and polarity representative of the direction and magnitude of deviation of the proportions of the materials blended from the predetermined proportions thereof and a servo valve responsive to the signal provided by the blend control and memory means for controlling the flow of at least one of the materials in a direction to maintain the predetermined proportions between the blended materials.

Another object is to provide blending apparatus as set forth above wherein the electro-mechanical blend control and memory means comprises a center tapped potentiometer having a voltage impressed across the resistance coil thereof, a servo valve connected between the movable arm of the potentiometer and the center tap and means responsive to the pulses from the computing totalizers for rotating the potentiometer coil in opposite directions to cause movement of the movable arm in opposite directions from the center tap.

Another object is to provide blending apparatus as set forth above wherein the means for rotating the potentiometer coil is an incremental stepping motor or a multi-pole synchronous motor.

Another object is to provide blending apparatus as set forth above wherein the means for rotating the potentiometer coil comprises a pair of ratchet wheels secured thereto for rotation therewith, a pair of solenoids connected to the computing totalizers for receiving energizing output pulses therefrom and armature members for the solenoids each engageable with a different ratchet wheel on energization of the associated solenoid to tend to rotate the potentiometer in opposite directions.

Another object is to provide blending apparatus as set forth above wherein the electro-mechanical blend control and memory means comprises an incremental stepping motor or multi-pole synchronous motor rotatable in a direction and by an amount determined by the variation in the number of pulses received thereby from the computing totalizers, a pair of limit switches and means movable in accordance with the angular direction and magnitude of rotation of the motor for closing the limit switches when the proportions of material blended is above or below the predetermined proportions respectively to provide an electric signal of polarity to energize the servo valve in a direction to control the quantity of at least one of the materials blended to maintain the predetermined proportion between the flowable materials.

Another object is to provide blending apparatus which is simple in construction, economical to manufacture and efficient in use.

Other objects and features of the invention will become apparent as the description proceeds, especially when taken in conjunction with the accompanying drawing, illustrating a preferred embodiment of the invention, wherein:

FIGURE 1 is a partly diagrammatic partly schematic representation of material blending apparatus constructed in accordance with the invention.

FIGURE 2 is a schematic diagram of a computing totalizer for use in the blending apparatus illustrated in FIGURE 1.

FIGURE 3 is a diagrammatic representation of a modification of the means for rotating the center tapped potentiometer coil of the blend control and memory means illustrated in FIGURE 1.

FIGURE 4 is a diagrammatic representation of a modification of the electro-mechanical blend control and memory means illustrated in FIGURE 1.

With particular reference to the figures of the drawing one embodiment of the present invention will now be disclosed.

As best shown in FIGURE 1 the material blending system of the invention comprises means 10 and 12 inserted in the lines 14 and 16 through which different material to be blended is passed each of which is operable to develop a digital or pulsed electric signal the number of pulses of which is proportional to the volume of material passed through the line in which it is inserted. The pulsed electric signals from the means 10 and 12 are fed through conductors 18 and 20 respectively to the computing totalizers 22 and 24 in the blending system of FIGURE 1 where they are divided by a factor operable to produce digital or pulsed output signals on conductors 26 and 28 representative of a particular engineering unit and desired proportions of the materials in lines 14 and 16. The engineering units are recorded on the counters 30 and 32 and the pulses from the computing totalizers are further used to actuate the electro-mechanical blend control and memory means 34 the output signal from which is used to position the servo valve 36. Servo valve 36 in turn is responsive to the output signal of the blend control and memory means 34 to control the flow of material through the line 16 in a direction to maintain a desired proportion between the material flowing through the lines 14 and 16.

More specifically the material flowing through the lines 14 and 16 may for example be gasoline of different octane. In such case the means 10 and 12 for developing pulsed electric signals the number of pulses in which are representative of the volume of flow in the conduits 14 and 16 respectivey may be turbine flow meters. Such meters are known in the hydraulic arts and will not therefore be considered in detail herein.

The digital computing totalizers 22 and 24, as best shown in FIGURE 2, each comprise three binary coded decimal counter stages 38, 40 and 42 constructed and arranged to count signal pulse inputs thereto from 1 to 999. Since decimal counters are well known the exact construction of the counters 38, 40 and 42 will not be considered herein.

The computing totalizers further include the factor switches 44, 46 and 48 as shown which may be manually set to provide the "and" circuit 50 with an actuating signal on any count from 1 to 999 of the decimal counter. An output signal from the "and" circuit over conductor 52 will provide a reset signal over conductor 53 to cause the decimal counter to be reset to a zero count and will provide an output over conductors 26 and 28 of the computing totalizers 22 and 24 to the counters 30 and 32 and conductors 58 and 60, as shown in FIGURE 1. Amplifier stages 62 and 56 are also provided in the computing totalizers to receive the signal input to the computing totalizers from the conductors 18 and 20 and to amplify the output of the "and" circuits 50 for feeding to the conductors 58 and 60 respectively.

The counters 30 and 32 may be conventional digital counters. The counters may indicate directly engineering units such as gallons of flow, imperial gallons, quarts, etc. on proper setting of the factor switches which will become more obvious on subsequent consideration of the over-all operation of the blending apparatus illustrated in FIGURE 1.

The blend control and memory means as shown in FIGURE 1 comprises a potentiometer 64 including a rotatable resistance coil 66 connected in series with the source of uni-directional electrical energy 72, a center tap 68 on coil 66 and a variable position wiper arm 70. The coil 66 of the potentiometer 64 is connected to the incremental stepping motor 74 which is responsive to the pulses received over conductor 58 from computing totalizer 22 through the up-pulser 76 to rotate the coil 66 in one direction and which is responsive to the pulses received over conductor 60 from the computing totalizer 24 through the down-pulser 78 to rotate the coil 66 in an opposite direction.

The up-pulser 76 and down-pulser 78 in the embodiment of the invention shown in FIGURE 1 may be amplification and impedance matching means. If the voltages available from the computing totalizers are suitable for operation of the incremental stepping motor 74 the up-pulser 76 and down-pulser 78 may be eliminated.

In operation, depending on whether there are more pulses received from the computing totalizer 22 or more pulses received from the computing totalizer 24, the movable wiper arm 70 of the potentiometer 64 will be moved in opposite directions from the center tap 68. Thus the signal provided to the servo valve 36 over conductors 71 and 73 on movement of the wiper arm 70 will vary in both magnitude and polarity in accordance with the difference in the number of pulses received by the blend control and memory means 34.

The servo valve 36 is operable to permit more or less flow through the line 16 depending on the polarity and magnitude of the signal received thereby. Further the servo valve 34 operates in a direction to maintain the proportions of the material passed through the lines 14 and 16 at the predetermined proportion as indicated by the setting of the factor switches 44, 46 and 48 of the computing totalizers 22 and 24 whereby the blended material in the line 80 is of a predetermined composition.

In over-all operation it will be assumed that it is desired to mix the material in the lines 14 and 16 in the proportion of three to one respectively. In such case the factor switches in the computing totalizer 22 will be set to provide an actuating signal to the "and" circuit when the counting stages thereof count 750 while the factor switches in the computing totalizer 24 are set to provide an actuating signal to the "and" circuit 50 therein when the counting stages thereof count 250. It will of course be understood that the switches may be set at other figures having a similar ratio such as 300 and 100 to provide for proper division of the electric pulses received by the computing totalizers to enable the counters 30 and 32 to read directly in desired engineering units.

With the factor switches so positioned if the servo valve 36 is in the correct position to provide the selected predetermined three to one proportion of material flowing through the lines 14 and 16 the pulses provided to the incremental stepping motor 74 through the up-pulser 76 and down-pulser 78 from the computing totalizers 22 and 24 will be equal in number. Therefore, the coil 66 of the center tapped potentiometer will not be rotated. Thus with the variable position arm 70 of the potentiometer initially positioned at the center tap 68 no electric signal will flow to the servo valve 36 and the proportion of the fluids flowing through the lines 14 and 16 will be unchanged.

However, if for example too much fluid flows through the line 14 as indicated by an increase in pulses sent to the computing totalizer 22 from the turbine flow meter 10 a proportional increase in the pulses received from the computing totalizer 22 by the incremental stepping motor 74 from the up-pulser 76 will result. Since more pulses are received by the motor 74 from the up-pulser 76 than from the down-pulser 78 the coil 66 is rotated in a direction to cause the variable position arm 70 to move in an up direction relative to the center tap 68. Movement of the variable position arm 70 in an up direction causes an electric signal to be transmitted to the servo valve 36 of a polarity to cause the servo valve 36 to open wider. The flow of fluid through the line 16 is thereby increased by an amount sufficient to rotate the incremental stepping motor 74 in the opposite direction to bring the variable position arm 70 back to the center tap position thereof and maintain the predetermined proportions of the material blended.

A similar and opposite operation will occur should too little fluid flow through the line 14.

Thus it will be seen that applicant has provided an improved blending system including an extremely simple electro-mechanical blend control and memory means capable of remembering a substantial deviation from a predetermined proportion of blended materials in either direction. Further applicant's blend control and memory means is rapid acting and if the fluid flow through the lines 14 and 16 is cut off for any reason on reestablishing of the flow therethrough the predetermined proportion is reestablished.

A modification of the apparatus for rotating the coil 66 of the potentiometer 64 is illustrated in FIGURE 3 and is intended to replace the incremental stepping motor 74. As shown in FIGURE 3 the pulsed signal from the computing totalizer 22 over line 58 is passed through an up-pulser solenoid 82 while the pulsed signal from the computing total 24 is passed through a down-pulser solenoid 84. The solenoids 82 and 84 have associated therewith the armatures 86 and 88 respectively having ratchet engaging portions 90 and 92 on the ends thereof as shown in FIGURE 3. The fingers 90 and 92 engage the ratchet wheels 94 and 96 respectively on the solenoids 82 and 84 being energized and are operable to produce rotation of the center tapped potentiometer coil 66 in opposite directions.

Thus in operation when both solenoids are energized at the same time no rotation is imparted to the center tap potentiometer coil 66. However, if one or the other of the solenoids 82 or 84 are energized by themselves the potentiometer coil 66 is rotated in one direction or the other to cause relative movement between the center tap 68 thereof and the variable position arm 70 as indicated above.

FIGURE 4 illustrates another embodiment of the blend control and memory means 34 of the blending apparatus illustrated in FIGURE 1. The blend control and memory means illustrated in FIGURE 4 includes a multipole synchronous motor 98 similar to the Slo-Syn motor produced by the Superior Electric Company of Bristol, Connecticut, which is rotatable in opposite directions in response to received pulsed signals such as the signals provided over the lines 58 and 60 from the computing totalizers 22 and 24. The rotation of the motor 98 is used to close either limit switch 100 or 102 when the proportions of materials flowing in the lines 14 and 16 differ a selected amount from the predetermined proportions.

Physical closing of the limit switches 100 and 102 is accomplished through the lever 104 and gearing 106 driven by the motor 98. The limit switches 100 and 102 in operation complete different circuits through the servo valve 108 having different electric characteristics such as polarity or phase to cause driving of the servo valve 108 in opposite directions to increase or decrease the material flow through the line 16 in a manner similar to the servo valve 36.

It will thus been seen that in accordance with the invention there is provided blending apparatus which is simpler in construction than previous apparatnus, is more economical to manufacture and is particularly reliable and efficient. The improved blending apparatus is provided through the use of improved electro-mechanical blend control and memory means rather than complicated expensive and sometimes unreliable electronic memory and blend control means.

While one embodiment of the invention has been disclosed in detail together with two modifications thereof it will be understood that other embodiments and modifications of the present invention are contemplated. For example, it will be understood that the invention may be used to blend more than two materials in different proportions. Further the use of a center tapped transformer instead of the potentiometer 64 and a source of alternating electric energy instead of battery 72 are contemplated by the inventor. It is therefore the intention to include all embodiments and modifications of the invention defined by the appended claims within the scope of the invention.

What I claim as my invention is:

1. Material blending apparatus for blending two materials in predetermined proportions comprising: a pair of turbine flow meters for developing separate digital electric signals the number of pulses of which are proportional to the quantity of the separate materials blended, a pair of computing totalizers for dividing the separate digital signals by factors operable to produce an identical number of signal pulses from the computing totalizers when the materials are blended in the predetermined proportions, each of said computing totalizers comprising three binary coded decimal counting stages and an "and" gate connected to the decimal counting stages by factor switches for providing an output pulse from the "and" gate after any predetermined number of pulses are received by the computing totalizers which predetermined number is selected by setting of the factor switches, a potentiometer including a rotatably mounted coil, a variable position arm and a center tap, a source of unidirectional electrical energy in series with the coil, motor means connected to the potentiometer coil for producing rotation thereof in opposite directions and means for applying the digital signals from the computing totalizers to said motor means for producing rotation of the coil in a direction and of a magnitude controlled by the number of pulses applied thereto from the computing totalizers and a servo valve connected between the center tap of the potentiometer and the variable position arm thereof responsive to rotation of the potentiometer coil and the resulting direction of movement of the arm from the center tap for varying the relative quantity of the materials blended to maintain the predetermined proportions of the blended materials.

2. Structure as claimed in claim 1 wherein the motor means comprises a reversible motor responsive to the digital signals.

3. Structure as claimed in claim 1 wherein the motor means comprises a plurality of ratchet wheels secured to the potentiometer coil for rotation therewith, solenoids associated with the ratchet wheels each connected to receive one of the digital signals and an armature associated with each of said solenoids including a portion operable to engage the associated ratchet wheel for producing rotation thereof and the potentiometer coil on energization of the solenoids with which they are associated by the individual pulses of the digital signals.

References Cited by the Examiner

UNITED STATES PATENTS

| | | | |
|---|---|---|---|
| 2,519,184 | 8/1950 | Grosdoff | 235—92 |
| 2,648,746 | 8/1953 | Dickey | 200—61.39 |
| 2,881,235 | 4/1959 | Van Pool | 235—151 |
| 3,002,818 | 10/1961 | Berger | 235—151 |
| 3,009,098 | 11/1961 | Simons | 235—151 |
| 3,025,510 | 3/1962 | Lovejoy | 340—347 |
| 3,034,718 | 5/1962 | Freitas et al. | 235—151 |
| 3,048,331 | 8/1962 | Van Nice et al. | 235—151 |
| 3,096,471 | 7/1963 | Taylor | 235—151 |

OTHER REFERENCES

Pages 120 to 125, 298 and 299, December 1954, Gordan, "Adapting Digital Techniques for Automatic Controls—II," Electrical Manufacturing, TK 1 E 37, vol. 54.

Pages 136 to 143, and 332, November 1954, Gordan, "Adapting Digital Techniques for Automatic Controls—I," Electrical Manufacturing TK 1 E 37, vol. 54.

MALCOLM A. MORRISON, *Primary Examiner.*

C. L. WHITHAM, I. KESCHNER, *Assistant Examiners.*